June 17, 1958  G. A. GILLEN  2,839,269
AIR TURBINE MOTOR FOR MOTOR VEHICLES
Filed March 7, 1955
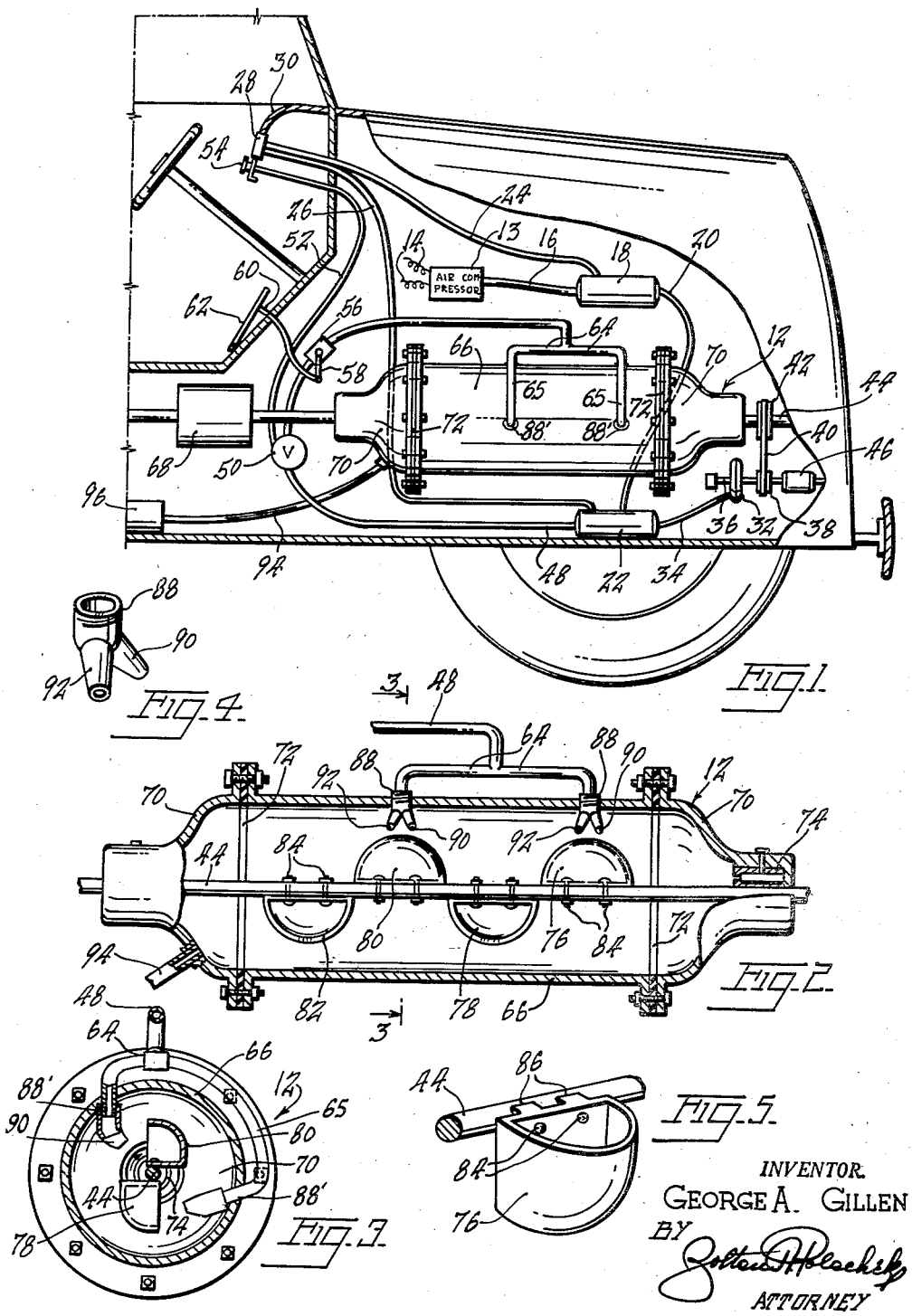
INVENTOR.
GEORGE A. GILLEN
BY
ATTORNEY United States Patent Office 2,839,269
Patented June 17, 1958

2,839,269

AIR TURBINE MOTOR FOR MOTOR VEHICLES

George A. Gillen, Jersey City, N. J.

Application March 7, 1955, Serial No. 492,579

1 Claim. (Cl. 253—55)

This invention relates to vehicle motors, and more particularly has reference to a turbine type motor driven by compressed air, and adapted for powering a suitable vehicle, such as an automobile.

A main object of the present invention is to provide a motor that will be operated at considerably less cost than that required for the operation of a conventional internal combustion engine.

Another object is to provide a highly simplified motor construction, capable of manufacture at a cost considerably less than that required in the manufacture of a conventional internal combustion engine.

Still another object is to provide an air turbine for incorporation in the driving mechanism of a vehicle, which turbine will be so designed as to include a novelly formed and arranged series of nozzles, adapted to direct jets of air under high pressure against a longitudinal series of buckets or scoops carried by the drive shaft.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 1 is a largely diagrammatic view, partly in section and partly in elevation, of the front portion of an automobile equipped with an air turbine motor formed in accordance with the present invention.

Fig. 2 is an enlarged longitudinal sectional view through the turbine.

Fig. 3 is a transverse sectional view through the turbine taken substantially on line 3—3 of Fig. 2, on a scale enlarged above that used in Fig. 2.

Fig. 4 is an enlarged perspective view of one of the nozzles of the turbine.

Fig. 5 is an enlarged, fragmentary perspective view of the drive shaft, and of one of the bucket-like turbine blades carried thereby.

An automobile 10 is illustrated in Fig. 1, provided with an air turbine motor generally designated 12, formed in accordance with the invention.

The motor includes a per se conventional, electrically operated air compressor 13, having conductors 14 extending from a source of electric power, not illustrated, such as a heavy duty automobile battery or series of batteries.

Air compressed by the compressor 13 is forced through a length of tubing 16 to a first reservoir 18 connected by a conduit 20 to a second air reservoir 22. Extending from the respective reservoirs are lines 24, 26 to a double pressure gauge 28 mounted upon the instrument panel 30 of the vehicle. The gauge 28 will be provided with a pair of index arms, each operatively associated with one of the lines 24 or 26, so that the pressure in both reservoirs can be readily determined by the operator of the vehicle at any time.

A conventionally constructed air pump 32 of the rotary type has an outlet line 34 extending to the reservoir 22, and is driven by a shaft 36 mounted in suitable bearings carried by a selected structural member of the vehicle. A driven pulley 38 is fixed to the shaft to rotate the same, and is driven by a belt 40 trained about a drive pulley 42 keyed or otherwise secured to the vehicle drive shaft 44.

Also driven by the shaft 36 in a conventional generator 46, which would be electrically connected in the circuit including the source of electric power and the air compressor, for the purpose of generating electricity which may be used to supply a part of the requirements of the air compressor.

To the outlet of the second reservoir 22 is connected a main turbine supply line 48, intermediate the ends of which there is provided a valve 50. The valve 50 is a main control valve, which can be used to shut off the flow of air under pressure through the line 48, and can be manually operated from the passenger or operator's compartment of the vehicle, through the medium of a flexible steel cable extending through a housing 52 and connected to a push-pull knob 54 mounted on the instrument panel 30.

Also connected in the line or conduit 48 is a butterfly valve 56, to the shaft of which is secured a radial arm 58 connected to one end of a flexible steel cable 60 the other end of which is connected to the accelerator pedal 62 of the vehicle. On depression of the accelerator, the valve 56 opens the conduit to a selected extent, to regulate the quantity of air flowing therethrough. In other words, when the accelerator is depressed to its maximum extent, the valve 56 is fully opened. When, on the other hand, the accelerator is in its opposite extreme position, the valve 56 is closed. Intermediate positions of the accelerator have the result of partially opening the valve 56, as will be readily understood.

At its discharge end, the conduit 48 opens into oppositely extending branch conduits 64, 64 and 65, 65 opening within an elongated, cylindrical turbine housing 66.

The drive shaft 44 extends axially within the housing 66, and projects out of the rear end of the housing, the shaft extending into a conventional gear box 68 having first, second, third, and reverse gears, controlled by a suitable hand lever, not shown, from within the vehicle, in the same manner as the gears of a vehicle powered with an internal combustion engine. From the gear box, the shaft extends longitudinally of the vehicle, and would be drivingly connected to selected driving wheels of the vehicle in the usual manner.

The cylindrical turbine housing 66, at its opposite ends, is formed with tapered heads 70 flanged at their larger ends for connection to end flanges on the cylindrical body portion of the housing. Compressible sealing gaskets 72 are interposed between the flanges to prevent leakage of air.

At their smaller ends, the heads 70 have bearing cups in which are mounted roller bearings 74 each of which is equipped with a grease fitting. The ends of the turbine housing can, and in a commercial embodiment undoubtedly would, be provided with packing glands through which the shaft 44 extends, to prevent leakage of air from the ends of the turbine housing.

Within the cylindrical body portion of the turbine housing, the shaft 44 has bucket-like turbine blades 76, 78, 80, 82 secured thereto. As will be seen from Fig. 2, alternate ones of the blades are aligned longitudinally of shaft 44, to provide longitudinal rows of the turbine blades, the blades of one row being angularly spaced 180° circumferentially of the shaft 44 from the blades of the other row. In other words, the blades 76, 80 are aligned with one another and the blades 78, 82 are also aligned with each other, with blades 76, 80 being spaced 180° from blades 78, 82 alternating therewith.

Any number of turbine blades can be provided, four being illustrated by way of example.

All the blades are identically formed, so the description of one will suffice for all. As shown in Fig. 5, blade 76 is secured to shaft 44 by bolts 84 passing through diametrically extending openings of the shaft, and at the location of the bolt-receiving apertures of the turbine blade, the outer surface of the blade is formed with lugs 86 having arcuate surfaces complementing the arcuate surface of the shaft 44 to provide a strong connection that will insure against shearing of the bolts 84 when the blades are secured to the shaft. Each blade at the side thereof adjacent the shaft is of rectangular formation, and the rectangular inner side of each blade merges into a portion at the outer side of the blade that is formed as a one-fourth segment of the sphere.

Associated with the blades 76, 78 to direct air thereagainst are nozzles 88, 88, said nozzles being secured to the ends of the branch pipes 64, 64, on one side of the drive shaft 44, while similar nozzles 88', 88' are arranged to direct air against the blades 80, 82, said nozzles 88', 88' being connected to the ends of branch pipes 65, 65, on the other side of the drive shaft. The nozzles are identical, each including an exteriorly threaded body threaded into a complementarily threaded opening of the body portion of the turbine housing. At its inner end, the body of each nozzle tapers, and integral with the tapered portion of each nozzle is a pair of divergent nozzle members 90, 92 tapering in a direction from the body of the nozzle. The nozzle members of each nozzle lie in a common plane oblique to a plane including the axis of the body of the nozzle. Since the axis of the nozzle body intersects perpendicularly with the axis of the shaft 44, the nozzles are pointed to one side of shaft 44 (Fig. 3) to direct jets of air along paths diverging in a direction away from the nozzle members, with each jet path extending as a chord of the turbine housing when the turbine housing is seen in cross section as in Fig. 3.

As a result the nozzle members 90 and 92 of nozzles 88 direct jets against the concave surfaces of the blades 76 and 80 on one side of the shaft 44 to drive the shaft clockwise as viewed in Fig. 3, and the nozzle members 90 and 92 of nozzles 88' direct jets against the concave surfaces of the blades 78 and 82 for driving the shaft in the same direction.

After the air has been directed against the nozzle blades, it is exhausted out of an inlet opening formed in one of the heads 70, to which outlet opening is connected an exhaust conduit 94 extending to a muffler 96 of the vehicle.

In operation, the air compressor is first operated with the main valve 50 closed, until air has been built up within the reservoirs 18, 22 to a selected pressure. Thereafter, the main valve is opened, and air will flow through the reservoirs, passing through the main supply conduit 48 to rotate the shaft 44. The shaft will be rotated at a selected rate of speed, by adjustable positioning of the butterfly valve 56 operable by depression of the accelerator pedal 62. The accelerator pedal, as will be understood, will be provided with a spring tending to shift the accelerator pedal to its outermost position and in this position of the accelerator pedal, the butterfly valve 56 will be closed.

When the shaft 44 is rotated by air forced against the turbine blades, jack shaft 36 will also be rotated, driving pump 32 which aids in pumping air to the compressed air reservoirs. Further, the generator 46 will now be driven, to supply a part of the requirements of the air compressor. Periodically, the air compressor may be stopped, even though the vehicle is in operation, whenever the air builds up to a predetermined pressure exceeding normal requirements.

While I have illustrated and described the preferred embodiment of my invention, it is to be understood that I do not limit myself to the precise construction herein disclosed and the right is reserved to all changes and modifications coming within the scope of the invention as defined in the appended claim.

Having thus described my invention, what I claim as new, and desire to secure by United States Letters Patent is:

In a fluid pressure turbine, an elongated hollow cylindrical housing closed at its ends by heads, said housing having a pair of spaced inlets at the top for passage of air fluid into the housing and having an outlet at the bottom in one of said heads for the discharge of said fluid from the housing, a rotor disposed in said housing centrally thereof, leaving a space therearound, said rotor including a shaft disposed axially of the housing and pairs of curved bucket-like blades spaced and secured along the shaft, the blades of each pair being disposed in opposite directions, a supply of motive fluid, pairs of nozzles disposed in said inlets for injecting said motive fluid into the housing against the surfaces of the blades, one pair of nozzles injecting motive fluid against the blades of one pair of blades, the other pair of nozzles injecting motive fluid against the blades of the other pair of blades.

References Cited in the file of this patent

UNITED STATES PATENTS

| | | |
|---|---|---|
| 451,259 | Brookwalter | Apr. 28, 1891 |
| 865,496 | Herrington | Sept. 10, 1907 |
| 900,342 | Ashley | Oct. 6, 1908 |
| 1,043,480 | Sundh | Nov. 5, 1912 |
| 1,063,089 | Walker | May 27, 1913 |
| 1,394,076 | FitzGibbon | Oct. 18, 1921 |
| 1,424,167 | King | Aug. 1, 1922 |
| 2,471,109 | Hunt | May 24, 1949 |

FOREIGN PATENTS

| | | |
|---|---|---|
| 309,319 | Italy | July 3, 1933 |